United States Patent [19]

Zapawa

[11] Patent Number: 4,611,375
[45] Date of Patent: Sep. 16, 1986

[54] APPARATUS FOR ASSEMBLING RADIATOR CORES

[75] Inventor: John J. Zapawa, Warren, Mich.

[73] Assignee: Progressive Tool & Industries Co., Southfield, Mich.

[21] Appl. No.: 742,975

[22] Filed: Jun. 10, 1985

[51] Int. Cl.[4] .................. B21D 53/02; B23P 15/26; B23P 19/00; B23Q 3/00

[52] U.S. Cl. .................. 29/157.3 C; 29/157.3 A; 29/157.3 B; 29/462; 29/464; 29/726

[58] Field of Search .................. 29/157.3 C, 157.3 A, 29/157.3 B, 157.3 R, 462, 464, 467, 559, 726, 727; 269/43, 903

[56] References Cited

U.S. PATENT DOCUMENTS 3,310,868  3/1967  La Porte et al. .............. 29/157.3 A Primary Examiner—Mark Rosenbaum
Assistant Examiner—Irene G. Golabi
Attorney, Agent, or Firm—Basile, Weintraub & Hanlon

[57] ABSTRACT

An automotive radiator core subassembly including a plurality of individual tubes disposed in uniformly spaced, parallel relationship with the opposite ends of the tubes seated in openings in spaced parallel headers joined into a rectangular peripheral frame by opposed side frame members with fins inserted between adjacent tubes is assembled by apparatus which includes a pair of finger assemblies operating at opposite sides of a support table. The finger assemblies each include a series of vertically disposed fingers interlinking to each other in a horizontally extensible chain. When the chains are extended, tubes are deposited between the fingers which are so spaced as to provide adequate room to deposit the fins between the tubes. Subsequent compression of the finger chains moves the tubes and fins into their final assembled relationship to each other and aligns the tubes with the openings in header members supported on header carriers on the machine frame.

10 Claims, 23 Drawing Figures

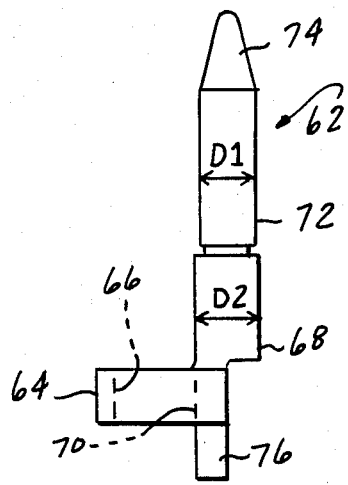
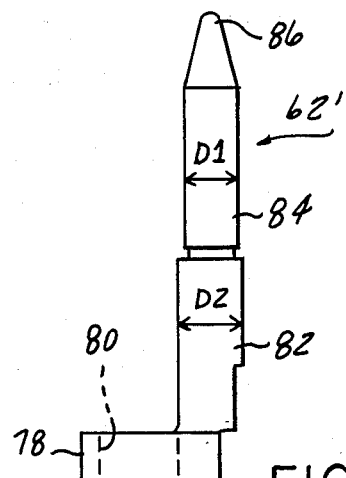
FIG-3
FIG-5
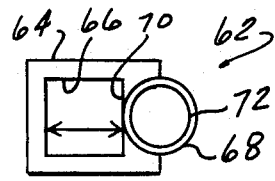
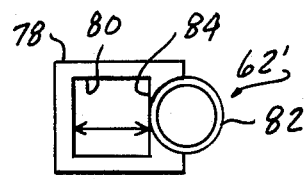
FIG-4
FIG-6
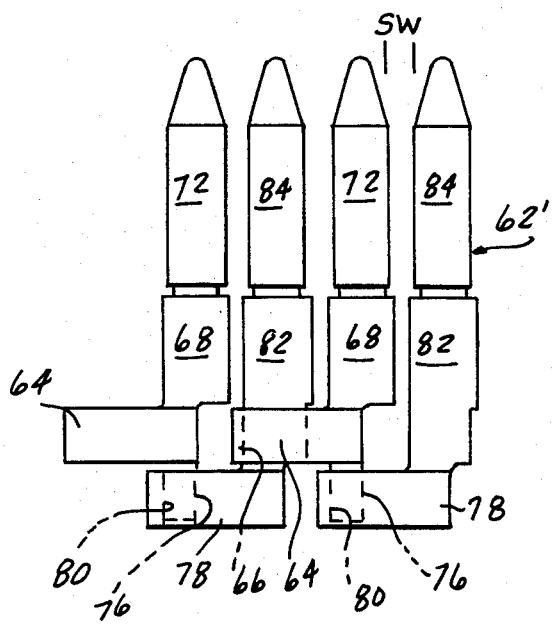
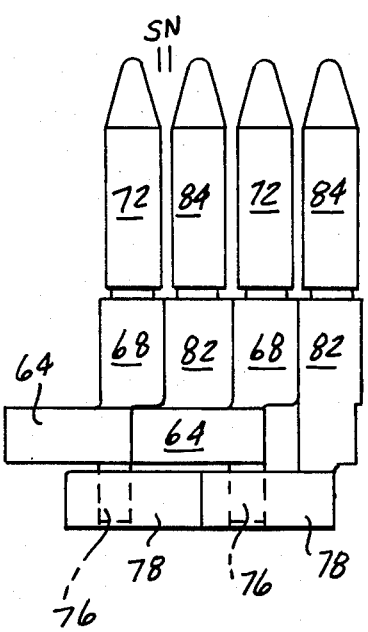
FIG-7
FIG-8

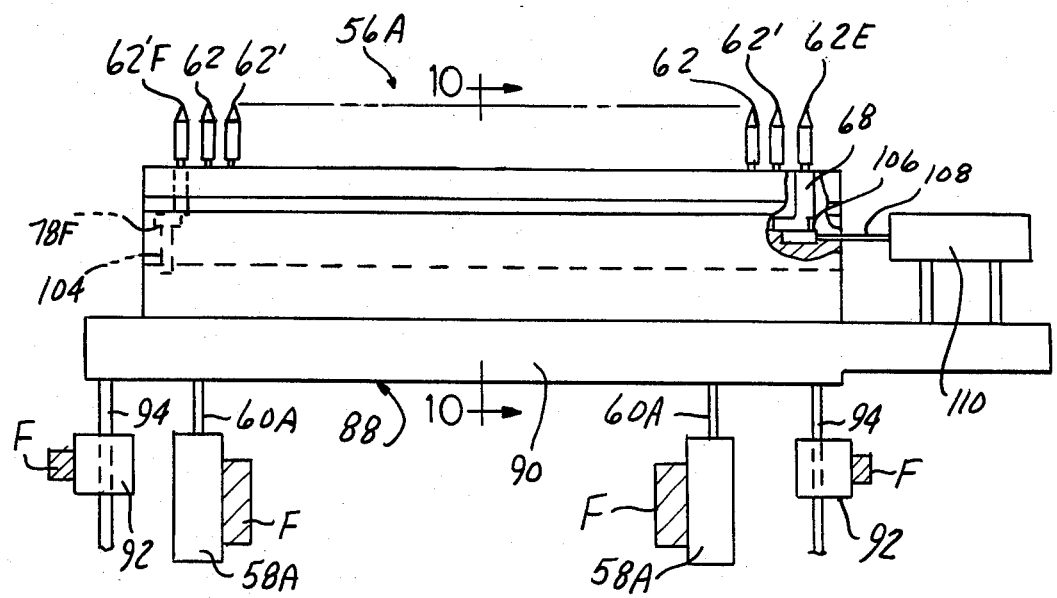
FIG-9
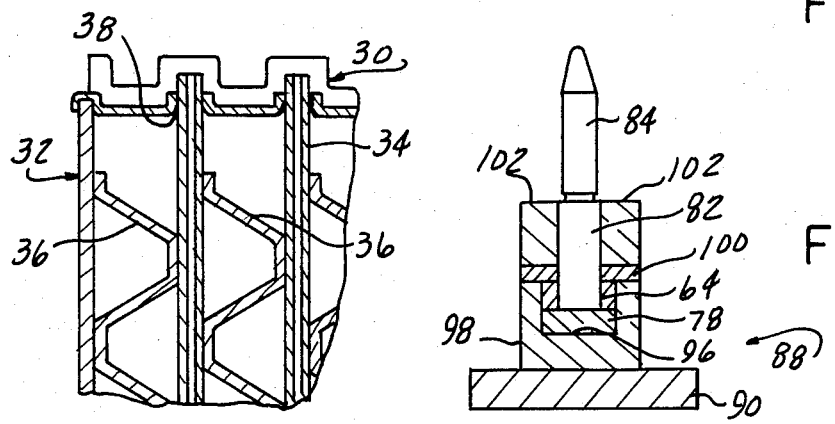
FIG-10
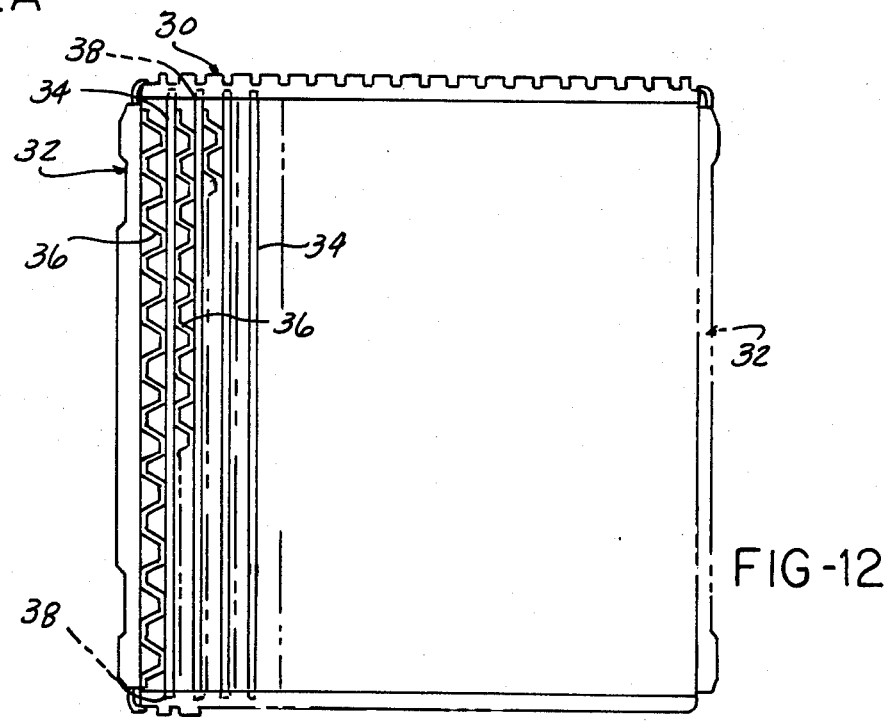
FIG-12A
FIG-12

APPARATUS FOR ASSEMBLING RADIATOR CORES

BACKGROUND OF THE INVENTION

The present invention is concerned with apparatus for assembling an automotive radiator core or subassembly in which a plurality of tubes extend in uniformly spaced, parallel relationship between and through a pair of spaced, parallel stamped aluminum headers which are interconnected into a rectangular, peripheral frame by side frame members secured to and extending between the ends of the headers. Cooling fins in the form of an elongate, zigzag strip of metal are engaged between adjacent tubes and between the endmost tubes and the adjacent side frame members.

The tubes are of an elongate, flattened, transverse cross-section and, when assembled, the flat sides of adjacent tubes are in opposed, facing relationship and the fin is clamped to extend back and forth between the opposed sides of adjacent tubes. In order to initially insert a fin between a pair of adjacent tubes, it is desirable that the tubes be spaced from each other by a distance somewhat greater than the transverse width of the fin which is formed from a relatively thin metal strip and must be handled quite carefully. After the fins and tubes have been loosely arranged in side-by-side relationship, movement of the side frame members of the core assembly laterally toward each other may be employed to compress the loose tube-fin assembly to reduce the spacing between adjacent tubes to a point where the fins are firmly clamped between the tubes and side frame assemblies. This compressing action is also employed to line up the individual tubes with the tube receiving openings in the headers.

The present invention is especially directed to apparatus for facilitating the last-described insertion and initial clamping of the fins between the tubes and aligning the tubes with openings in the headers.

SUMMARY OF THE INVENTION

An apparatus for performing the assembly process of the present invention includes a horizontal, rectangular support table. Side frame support carriers are mounted at two opposed sides of the table and header carriers are mounted at each of the two remaining opposed sides of the table. One side frame carrier is stationary while the opposite side frame carrier and the two header carriers are mounted for reciprocatory movement toward and away from the opposed carriers between a retracted position and an inwardly projected position at which side frames and head frames mounted on the respective carriers are located in their final, assembled relationship to each other.

At the beginning of the assembly process, side frames and headers are detachably mounted on the respective carriers with the three movable carriers in their retracted positions. A series of vertical locator fingers are then located in a ready position in which the fingers extend in a straight line between each header and the adjacent edge of the table with the fingers projecting upwardly above the table surface. The fingers are interconnected to each other by a lost motion connection which links the fingers into an extensible chain which, when fully extended, positions adjacent fingers in the chain at a maximum, uniform spacing from each other which is greater than the thickness of a tube. When the chain of fingers is longitudinally compressed, adjacent fingers are spaced from each other by a distance equal to the nominal thickness of the tube. The thickness of the fingers longitudinally of the chains is equal to the final assembled spacing between adjacent tubes; and the chains are so aligned with the header carriers that, when the chains are compressed, the tubes engaged between the fingers are accurately aligned with the tube-receiving openings in the headers mounted on the header carriers.

With the movable carriers retracted, the fingers projected above the surface of the table, and the chains of fingers in their fully extended position, tubes are dropped into position between each pair of adjacent fingers. Fins are then inserted between each adjacent pair of tubes and between each side frame and the adjacent endmost tube in the array of tubes. The spacing between the fingers at this time is such that the space between adjacent tubes is more than ample to accommodate the insertion of the fins. The chains of fingers are then compressed, locating the tubes in alignment with the openings in the headers mounted on the header carriers. The movable side frame carrier is actuated to its fully extended position to thus locate the two side frame members in their final assembled relationship to each other and to firmuly clamp the fins between adjacent tubes and the side frame members. The fingers remain in their elevated position during this last operation, thus preventing the zigzag fins from expanding or extending in the direction longitudinally of the tubes as the fins are transversely compressed by the clamping action.

The fingers are then retracted downwardly below the surface of the table and the header carriers are actuated to drive the headers in to their final assembled relationship with the tubes and side frame members, the ends of the tubes passing through the openings in the headers during this movement of the headers. Following location of the headers in their final assembled position, swaging tools may be inserted into the tube ends to swage the tube ends into firmly seated relationship with the header, and tab arrangements may be deformed to mechanically clamp the side frames and headers to each other.

Other objects and features of the invention will become apparent by reference to the following specification and to the drawings.

IN THE DRAWINGS

FIG. 3 is a side elevational view of a first form of finger employed in the apparatus of FIG. 1;

FIG. 4 is a top plan view of the finger of FIG. 3;

FIG. 5 is a detailed, side elevational view of a second form of finger employed in conjunction with the finger of FIG. 3 in the apparatus of FIG. 1;

FIG. 6 is a top plan view of the finger of FIG. 5;

FIG. 7 is a detailed, side elevational view of a portion of a chain made up of interlinked fingers of FIGS. 3 and 5, showing the chain in an extended condition;

FIG. 8 is a view similar to that of FIG. 7 showing the chain of fingers in a compressed condition;

FIG. 9 is a detailed, side elevational view, partially schematic, of a tube aligning assembly employed in the apparatus of FIG. 1;

FIG. 10 is a cross-sectional view taken on the line 10—10 of FIG. 9;

FIG. 12 is a front view of a radiator core assembly assembled by the apparatus of FIG. 1;

FIG. 12A is a detailed, cross-sectional view of a corner of the assembly of FIG. 12;

Figure 11:
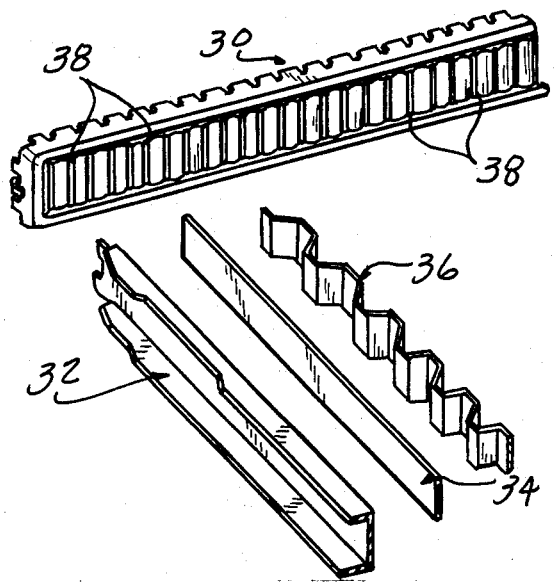
FIG. 11 is an exploded, perspective view showing individual parts of a radiator core assembly to be assembled by the apparatus of FIG. 1.

Referring first to FIGS. 11, 12 and 12A, the individual components of the radiator core subassembly which is to be assembled in accordance with the present invention are shown in the perspective view of FIG. 11. The parts include a header designated generally 30, a side frame member designated generally 32, a tube 34 and a fin 36. In the assembled core subassembly, as best seen in FIG. 12, a pair of headers 30 and a pair of side frame members 32 are assembled into a rectangular outer framework. Within this outer framework, a plurality of tubes 34 extend in uniformly spaced, parallel relationship between headers 30, the ends of tubes 34 projecting through openings 38 (FIGS. 11 and 12A) in headers 30. As best seen in the perspective view of FIG. 11, the tubes 34 are of a flattened, elongate, generally rectangular transverse cross-section and the fins 36 are clamped between the flat sides of adjacent tubes 34 and between the side frames 32 and the adjacent endmost tube 34 of the array of tubes in the subassembly. Fins 36 are of elongate, zigzag configuration and are formed from a relatively thin metal strip.

All of the individual components of the radiator core are preferably constructed from aluminum and coated with a brazing compound. After the mechaninical assembly of the various parts to be described below, the assembled radiator core subassembly is passed through an oven to firmly braze the parts to each other in their assembled relationship.

Figure 1:
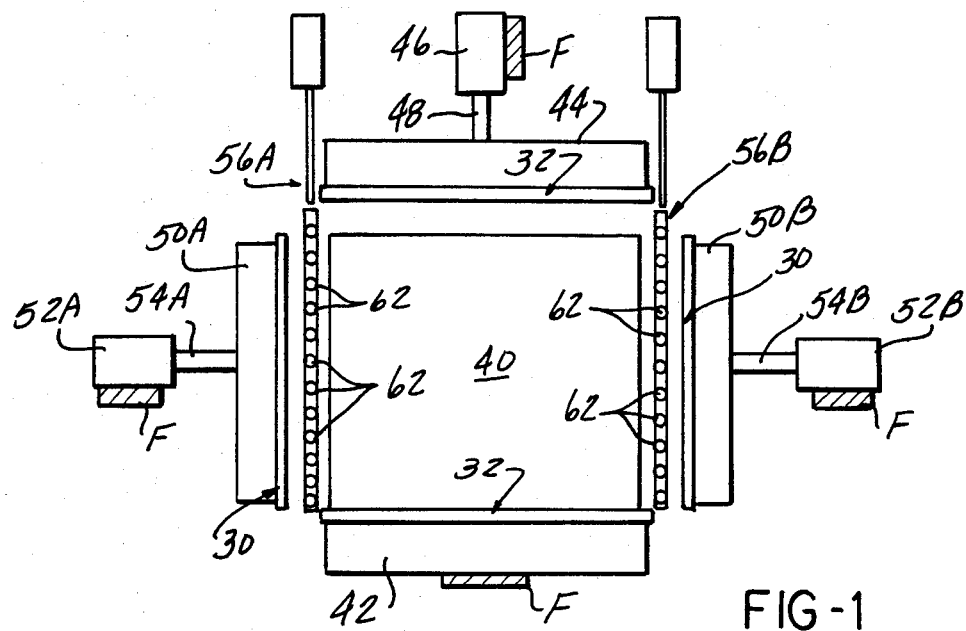
FIG. 1 is a schematic diagram of a top plan view of an apparatus for assembling radiator cores.
Figure 2:
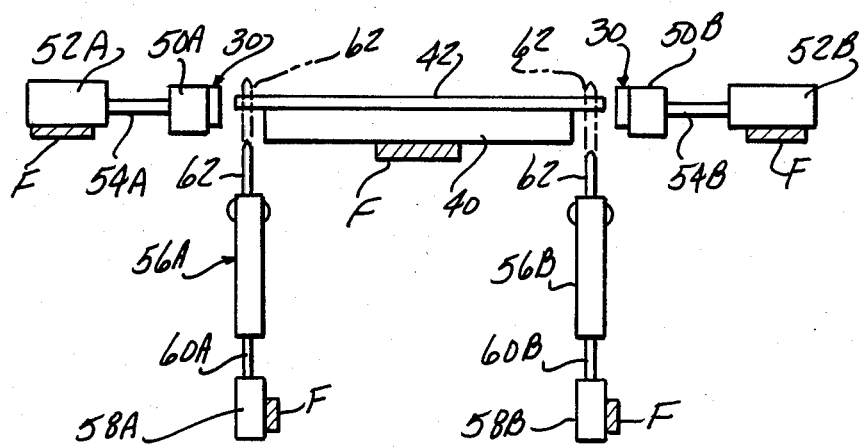
FIG. 2 is a schematic diagram of a front view of the apparatus of FIG. 1.

Referring now to FIGS. 1 and 2, an apparatus for assembling the radiator core from the components described above is shown schematically. The apparatus includes a horizontal, rectangular support table 40 fixedly mounted on the frame F of the machine. Referring now particularly to FIG. 1, a first side frame carrier 42 is fixedly mounted upon the machine frame F to extend along one side of table 40 to detachably support a side frame 32 on the upper surface of table 40 along that edge of the table. A second side frame carrier 44 is mounted adjacent the opposite side of table 40 to detachably support a side frame 32 in spaced, opposed relationship to the side frame 32 carried on the fixed support frame carrier 42. The second side frame support carrier 44 is mounted upon the machine frame for movement toward and away from the fixed support side frame carrier 42, this movement being accomplished by a hydraulic cylinder 46 fixedly mounted upon the machine frame and having a piston rod 48 coupled to carrier 44. As shown in FIG. 1, piston rod 48 is fully retracted into its cylinder 46 to locate carrier 44 in a position in which the side frame 32 on carrier 44 is spaced from the side frame 32 on fixed carrier 42 by a distance substantially greater than the spacing between the two side frames 32 when finally assembled into the subassembly. Actuation of cylinder 46 to extend piston rod 48 will drive carrier 44 toward carrier 42 until, at maximum extension of piston rod 48, the side frame 32 carried by carrier 44 is located in its final assembled relationship relative to the side frame 32 on fixed carrier 42.

A pair of header carriers 50A and 50B are respectively mounted adjacent the other two opposed sides of table 40. As was the case with side frame carrier 44, the two header carriers 50A and 50B are movable relative to machine frame F by hydraulic cylinders 52A, 52B fixedly mounted upon the machine frame and having piston rods 54A and 54B respectively coupled to the header carriers. The header carriers are movable by their associated cylinders beween a retracted position shown in FIG. 1 and an extended position in which the headers 30, which are detachably mounted upon the respective carriers, are located in their final assembled relationship to each other. The header carriers 50A and 50B are aligned with the fixed sidee frame carrier 42 in a fashion such that when the header carriers 50A and 50B are actuated to their extended position, the headers 30 carried on the header carriers are moved into their final assembled relationship with the side frame 32 carried on the fixed side frame carrier 42. When side frame carrier 44 is extended simultaneously with header carriers 50A and 50B, the side frames and headers are all located in their final assembled relationship with each other.

Structural details of the carriers, guides, limit stops and the hydraulic circuit for controlling the actuation of cylinders 46, 52A, 52B have been omitted in that these are conventional and do not, per se, form a part of the present invention. The means by which the side frames and headers are detachably mounted upon their carriers may take any of several forms and will vary with the structure of the particular side frames and headers employed and, again, the specific structure of these devices do not, per se, form part of the present invention.

As shown in FIGS. 1 and 2, the apparatus further includes a pair of tube aligning assemblies designated generally 56A and 56B which, as best seen in FIG. 2, are mounted upon the machine frame for vertical movement in general planes closely adjacent the edges of table 40 which are adjacent header carriers 50A and 50B. The tube aligning assemblies 56A and 56B are driven in vertical movement by hydraulic cylinders 58A, 58B (see FIG. 2) fixedly secured to machine frame F and having piston rods 60A, 60B respectively connected to assemblies 56A and 56B. In FIG. 2, assemblies 56A and 56B are shwon in their lowered or retracted position in which the fingers 62 of the tube aligning assemblies are disposed below the surface of table 40.

Upon extension of piston rods 60A and 60B, the fingers 62 may be elevated to the broken line position of FIG. 2 in which the fingers project upwardly above the surface of table 40 for a purpose to be described below.

Further details of tube aligning assemblies 56A, 56B are shown in FIGS. 3–10. The two assemblies 56A and 56B are of identical construction, and the following description of assembly 56A is equally applicable to assembly 56B.

Each tube aligning assembly includes a plurality of individual fingers 62 and, as best seen from a comparison of FIGS. 3 and 5, two forms of fingers 62 and 62' are employed.

Referring first to FIGS. 3 and 4, a first form of finger 62 includes a generally rectangular base 64 having a rectangular opening 66 extending vertically through the base. Integrally formed at the rear or right-hand end as viewed in FIGS. 3 and 4 with base 64 is an upwardly projecting, cylindrical spacer section 68 so located upon base 64 that the rearward or right-hand edge 70 of opening 66 is tangent to the cylindrical spacer 68.

Projecting upwardly from spacer 68 is a cylindrical finger section 72 which is coaxial with the cylindrical spacer 68 and of a diameter D1 which is smaller than the diameter D2 of spacer 68. The upper end of finger section 72 is of a generally conical configuration.

Projecting downwardly from the rear or right-hand end of base 64 is a semicylindrical pin 76 which may be considered to be a downward extension of the forward half of spacer 68 and which is, like spacer 68, tangent to the rearward edge 70 of opening 66.

Referring now to FIGS. 5 and 6, a second form of finger 62' is formed with a rectangular base 78 having a rectangular opening 80 extending vertically through the base. A cylindrical spacer section 82 is formed integrally with and projects vertically upwardly from the rearward or righ-hand portion, as viewed in FIGS. 5 and 6, of base 78 with the rearward edge of opening 80 being tangent to the cylindrical spacer 82. A cylindrical finger section 84 projects coaxially upwardly from the upper end of spacer 82 and its upper end is of a conical configuration as at 86. The diameter D1 of the finger section 84 of finger 62' is the same as the diameter D1 of finger section 72 of finger 62, the diameter D2 of spacer 82 is the same diameter as diameter D2 of spacer 68 of finger 62 and, referring to FIGS. 4 and 6, the length L of the rectangular opening 80 of finger 62' is equal to the length L of opening 66 in finger 62.

Essentially the difference between fingers 62 and 62' is the elevation at which the base 64 or 78 is located upon the finger. The reason for this difference is best appreciated by reference to FIGS. 7 and 8 in which fingers 62 and 62' are shown linked to each other into a chain in which fingers 62 are alternated with fingers 62'.

A finger 62 is linked to a finger 62' by inserting the downward extension 76 of finger 62 into the opening 80 of a finger 62'. A finger 62' is in turn linked to a finger 62 by passing the finger section 84 and spacer 82 of the finger 62' upwardly through the opening 66 in a finger 62. When so linked, the bottom of a base 64 of a finger 62 will rest upon the top of a base 80 of the adjacent finger 62'.

The length L of openings 66 and 80 is greater than the diameter D2 of the spacers 68 and 82 of the fingers; and thus when the fingers are connected into a chain, as partially indicated in FIGS. 7 and 8, there is a lost motion connection between the fingers. When the chain of fingers is extended so that the extensions 76 of fingers 72 abut the forward edges of openings 80 in fingers 62' and the spacers 82 of fingers 62' abut the forward edges of the opening 66 in fingers 62, the chain of fingers is in what will be described as an extended position in which a maximum spacing $S_w$ (FIG. 7) exists between adjacent finger sections 72 and 84.

When the chain of fingers is longitudinally compressed as in FIG. 8, the spacers 68 and 82 of adjacent fingers abut each other as indicated, and the spacing between adjacent finger sections 72 and 84 is reduced to a minimum spacing $S_n$ as shown in FIG. 8.

Referring now to FIGS. 9 and 10, the tube aligning assembly 56A includes a chain of fingers 62, 62' interlinked, as shown in FIGS. 7 and 8, mounted on a carrier designated generally 88. Carrier 88 includes a main frame or body 90 guided for vertical movement relative to the machine frame F as by a pair of collars 92 (FIG. 9) fixedly mounted on frame F which slidably receive vertical guide rod 94 fixedly mounted at one end to body 90. The piston rods 60A of motors 58A (see FIG. 2) are connected to body 90 to raise and lower the body in the manner described above.

The bases 64 and 78 of fingers 62 and 62' are snugly and sildably received within a slot 96 formed in a guide member 98 fixedly mounted upon body 90. A pair of cap strips 100 are mounted upon the top of guide member 98 to overlie the slot and slidably engage the top surfaces of bases 64 of fingers 62, and a pair of side rails 102 fixedly secured to and projecting upwardly from cap strip 100 sildably engage the opposite sides of the spacer sections 68, 82 of the fingers 62 and 62'.

Referring now to FIG. 9, the forwardmost finger of the chain of fingers mounted in carrier 88 is a slightly modified form of a finger 62', designated 62'F, whose base 78F is formed without the opening 80 of the regular fingers 62'. The base 78F is bored and counterbored to receive a machine screw 104 which is threaded into guide member 98 to hold the finger 62'F fixed with respect to the carrier body. The finger immediately to the right of finger 62'F in FIG. 9 is a normal finger 62 coupled to the fixed finger 62'F via its opening 66.

At the opposite end of the chain of fingers, the endmost finger 62E is a normal finger 62 whose lower extension 76 is received within a bore in a adaptor 106 which is theradably connected to the end of a piston rod 108 which projects from a fluid cylinder 110 fixedly mounted upon base 90 of the carrier.

Actuation of cylinder 110 is employed to extend and retract piston rod 108, which in turn compresses or extends the chain of fingers in the fashion illustrated in FIGS. 7 and 8.

The diameters D1 and D2 of the finger sections 72, 84 and spacer sections 68, 82 of the fingers are determined by the transverse dimensions of the tubes and fins of the radiator assembly. The difference between diameter D2 and diameter D1 only slightly exceeds the transverse thickness or width of the tubes 34 so that when the chain of fingers is longitudinally compressed, as shown in FIG. 8, the spacing $S_n$ between adjacent finger sections 72 and 84 only slightly exceeds the thickness of the tube and a tube engaged between two adjacent fingers will have its opposed sides substantially in engagement with both of the adjacent fingers.

The diameter D1 of the finger sections 72, 84 of the fingers is equal to the spacing between the sides of adjacent tubes when the tubes are in their final assembled position in the radiator core. This is in turn a distance equal to the transverse width of the zigzag fins 36.

When the chain of fingers is compressed, the tube receiving spaces between adjacent finger sections are aligned with the openings 38 in the headers 32 on carriers 50A, 50B.

The length L of the openings 66, 80 of fingers 62 and 62' is selected to be such that when the chain of fingers is extended, as in FIG. 7, the distance $S_w$ between adjacent finger sections 72, 84 is approximately twice the transverse width or thickness of a tube to afford adequate spacing between adjacent tubes to facilitate the loading of fins between adjacent tubes during the assembly process in a manner to be described below.

ASSEMBLY SEQUENCE

Referring now to FIGS. 13–18, these figures schematically show various stages of the operation of the apparatus described above in assembling the radiator core subassembly shown in FIG. 12.

Figure 13:
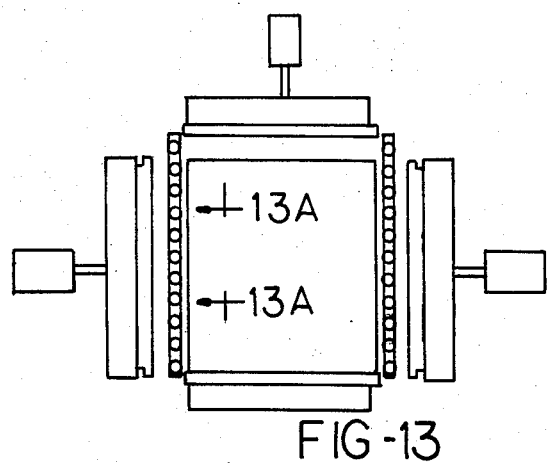
FIG. 13 is a schematic diagram showing a top plan view of the apparatus of FIG. 1 at the completion of the first step of the assembly process.
Figure 13A:
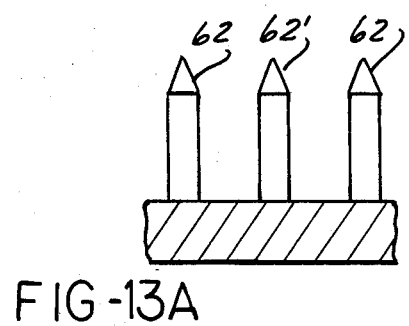
FIG. 13A is a partial, cross-sectional view taken on the line 13A—13A of FIG. 13.

In FIG. 13, a schematic diagram similar to FIG. 1 is shown with the various parts in the positions in which they are located at the commencement of the assembly operation. Header carriers 50A and 50B are retracted, as is side frame carrier 44. Headers 30 and side frames 32 have been manually mounted upon their respective carriers. Tube aligning assemblies 56A and 56B are in their elevated position with the cylindrical finger sections 72 and 84 of the individual fingers projecting upwardly above the surface of table 40, as indicated in the cross-sectional sketch of FIG. 13A. The chains of fingers 62, 62' on the respective carriers are in their extended positions—i.e., the positions shown in FIG. 7.

As described above, at this time the side frame 32 mounted upon the fixed side frame carrier 42 is in the position in which it will be when the radiator core is finally assembled by the apparatus—in other words, the side frame 32 carried by carrier 42 does not move at all during the assembly operation. The headers 30 mounted on header carriers 50A and 50B are held retracted outwardly from their final assembled position, but the ends of headers 30 adjacent fixed side frame carrier 42 are laterally aligned with the side frame member 32 carried upon carrier 42. The opposite side frame member 32 is at this time supported by its carrier 44 well outwardly of its final assembled position relative to the opposed side frame member 32 on the fixed carrier 42.

Figure 14:
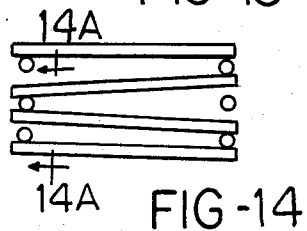
FIG. 14 is a partial, schematic diagram of a subsequent step in the assembly process.
Figure 14A:
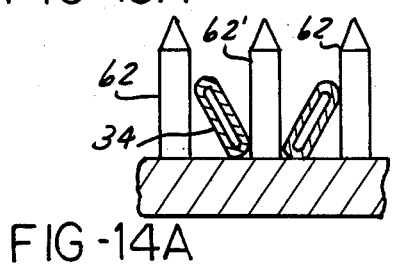
FIG. 14A is a partial, cross-sectional view taken on the line 14A—14A of FIG. 14.

FIGS. 14 and 14A show the completion of the next step of the assembly operation. Tubes 34 have now been deposited on edge between adjacent pairs of fingers 62, 62', the chains of fingers being extended at this time. Because the spacing between adjacent fingers 62, 62' of the extended chains is greater than the width of the tubes, the tubes will not necessarily be precisely parallel or precisely upright. For purposes of the present application, it may be assumed that the tubes are manually deposited between the fingers; however, automatic dispensers for loading the tubes between the fingers are employed in practice. In that these automatic dispensers do not, per se, constitute a part of the present invention, such a dispenser has not been shown in the drawings.

Figure 15:
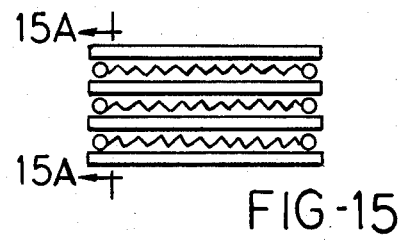
FIG. 15 is a partial, schematic diagram of a subsequent step in the assembly process.
Figure 16:
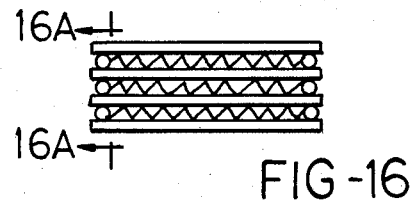
FIG. 16 is a schematic diagram of a subsequent step in the assembly process.
Figure 17:
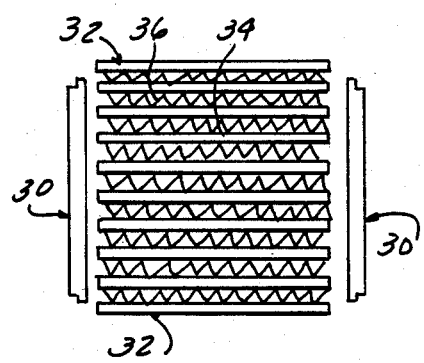
FIG. 17 is a schematic diagram, similar to FIG. 13, showing a step in the process subsequent to the step shown in FIG. 16.
Figure 15A:
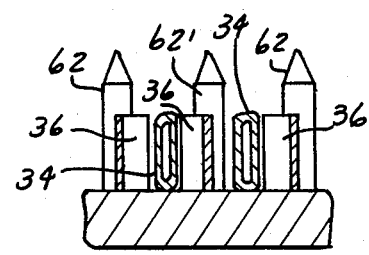
FIG. 15A is a partial, cross-sectional view taken on the line 15A—15A of FIG. 15.
Figure 16A:
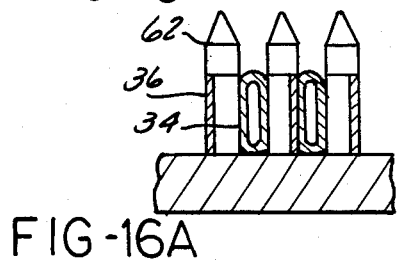
FIG. 16A is a detailed, cross-sectional view taken on the line 16A—16A of FIG. 16.

The next step in the assembly operation is to deposit fins 36 between the tubes 34. Again, it may be assumed this operation is performed manually. In practice, the required number of fins are loaded upon a tray between ribs which project upwardly from the surface of the tray. The ribs have a width equal to the width of the tubes and are spaced from each other by a transverse, center-to-center distance corresponding to the center-to-center distance between the midpoint of the spaces between the fingers 62, 62' when the chain is stretched. Slots at one end of the tray may slidably receive the upper edge of the tubes and, upon tilting of the tray and drawing the tray longitudinally along the length of the tubes, the individual fins will slide from the tray into the spaces between the tubes. The fins which are disposed between the outermost tubes and the respective side frame members 32 are manually loaded individually. It will be noted that the upwardly projecting fingers 62 and 62', in addition to spacing the tubes from each other, also serve to longitudinally confine the fins 36. FIGS. 15 and 15A show the conclusion of the fin-loading operation.

After the fins have been loaded, the chains of fingers 62, 62' are compressed into the relationship shown in FIG. 8 by actuation of the cylinders 110 which extend the pistion rods 108 the appropriate distance to compress the chains of fingers. Hydraulic cylindr 46 is also actuated at this time to advance the movable side frame carrier 44 forwardly to advance the side frame 32 carried by carrier 44 to its final assembled position relative to the opposed side frame member 32 on fixed carrier 42. After the movable side frame carrier 44 has been so actuated, tube aligning assemblies 56A and 56B are lowered to retract the fingers 62, 62' downwardly below the surface of table 40. The transverse compression applied by the movable side frame carrier 44 frictionally maintains the fins and tubes against movement subsequent to withdrawal of the fingers from between the tubes, and the compression of the chains prior to this withdrawal has located the tubes 34 in alignment with the tube-receiving openings in the headers 30 mounted upon header carriers 50A, 50B.

Figure 18:
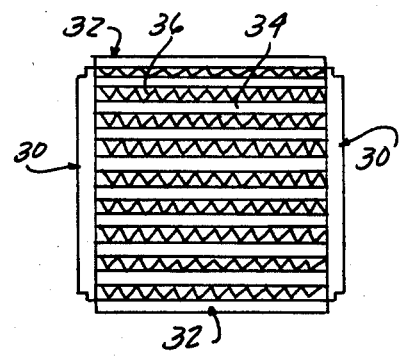
FIG. 18 is a schematic diagram showing the final step in the assembly process.

The next step in the assembly operation is shown in FIG. 18 and finds the header carriers 50A, 50B driven inwardly to their final assembled relationship with the side frame members, the ends of tubes 34 passing into and through the header openings 38 during this inward movement of the header carriers under the actuation of header carrier cylinders 52A and 52B.

This final seating of the headers may be combined with actuation of an appropriate mechanism (not shown) to crimp tabs located on the header and/or side frame members to mechanically secure these members to each other and a staking or swaging operation may be performed on the ends of the tubes to firmly seat the tubes in the header openings.

While one embodiment of the invention has been described in detail, it will be apparent to those skilled in the art that the disclosed embodiment may be modified. Therefore, the foregoing description is to be considered exemplary rather than limiting, and the true scope of the invention is that defined in the following claims.

What is claimed is:

1. Apparatus for locating a plurality of like elongate first members of a uniform first width in uniformly spaced, parallel relationship with a plurality of like elongate second members of a uniform second width respectively interposed between and clampingly engaged by adjacent first members, said apparatus comprising
    a support table having a pair of opposed parallel side edges spaced from each other by a distance less than the length of a first member, a pair of like aligning assemblies located adjacent to and respectively extending along said side edges, each of said aligning assemblies comprising a guide member having an upwardly opening elongate slot therein extending parallel to the adjacent side edge of said table, a plurality of vertically projecting fingers, each including a finger base at its lower end mounted in said slot for guided sliding movement longitudinally of said slot and an upper portion projecting from the base upwardly above said guide member, lost motion link means interlinking the bases of said fingers into a chain of fingers extending longitudinally of said slot, said lost motion means accommodating movement of adjacent fingers relative to each other longitudinally of said slot between a minimum spacing wherein the upper portions of adjacent fingers are spaced from each other by a distance substantially equal to said first width and a maximum spacing wherein the upper portions of adjacent fingers are spaced from each other by a distance substantially greater than said first width, means securing the finger at one end of said chain to said guide member at one end of said slot, a reciprocable actuating means mounted on said member and coupled to the finger at the opposite end of said chain for selectively extending said chain to an extended length at which all of said fingers are at said maximum spacing from each other or for compressing said chain to a shortened length at which all of said fingers are at said minimum spacing from each other, the upper end portion of each of said fingers being of a cylindrical configuration having a diameter equal to said second uniform width and projecting upwardly above said table to receive said first members therebetween.

2. The invention defined in claim 1 wherein said fingers include a plurality of first fingers, the base of each first finger being located at the bottom of the first finger and projecting horizontally forwardly of the cylindrical upper end portion of the first finger toward said one end of said slot, a plurality of second fingers, the base of each of said second finger being located upwardly from the bottom of the second finger by a distance substantially equal to the vertical thickness of the base of a first finger and projecting forwardly of the cylindrical upper end portion of the second finger toward said one end of said slot, said second fingers each having a pin portion projecting downwardly from the bottom of its base, the bases of said first and second fingers having like openings extending vertically therethrough and extending forwardly from the cylindrical upper end portion of the respective fingers by a distance greater than the diameter of the cylindrical upper end portion, said first and second fingers being alternated with each other in said chain with said pin on each second finger projecting downwardly into the opening in the base of an adjacent first finger and the cylindrical upper end portion of each first finger projecting upwardly through the opening in the base of an adjacent second finger to constitute said interlinking means.

3. The invention defined in claim 1 wherein each of said cylindrical upper end portions of said fingers comprises a cylindrical lower section of a first diameter and a cylindrical upper section of a second diameter projecting coaxially upwardly from the top of said lower section; the rearward edge of the opening of the finger base being tangent to the forward portion of the cylindrical lower section, the lower sections of the spacing finger members on adjacent fingers being engaged with each other when said fingers are at said minimum spacing, and the difference between said first and second diamters being equal to said first width of first members.

4. The invention defined in claim 3 wherein said second diameter is equal to said second width of said second members.

5. In a radiator assembly machine for assembling a plurality of like tubes into uniformly spaced, parallel relationship with each other with the opposite ends of the tubes seated in uniformly spaced openings in a pair of spaced parallel header members, said machine comprising a flat, horizontal support table of a width between two opposed sides thereof less than the spacing between said header members, a pair of header carriers mounted for horizontal reciprocatory movement respectively toward and away from said two opposed sides of said table, and a tube aligning means for locating and aligning a plurality of tubes on said table with the respective openings in header members carried by said header carriers;

the improvement wherein said tube aligning means comprises a pair of elongate, horizontally disposed guide members extending parallel to and respectively adjacent said opposed sides of said table, each of said guide members having an upwardly opening elongate slot therein extending parallel to the adjacent side of said table, a plurality of finger members, each finger member including a base portion slidably received in said slot for guided movement longitudinally along said slot and a cylindrical finger portion fixedly secured to and projecting vertically upwardly from said base portion and said guide member to project above the surface of said support table, said finger portions having a diameter equal to the spaceing between said openings in said header members, lost motion link means linking adjacent finger members to each other in a chain, said lost motion means accommodating limited movement of adjacent finger members relative to each other longitudinally of said slot between a tube receiving relationship wherein the finger portions of adjacent finger members are spaced longitudinally of said chain from each other by a distance substantially greater than the thickness of a tube and a tube locating position wherein the finger portions of adjacent finger members are spaced from each other longitudinally of said chain by a distance substantially equal to the width of a tube and are aligned with the spaces between the openings in header members mounted on said header carriers, means fixing the finger member at one end of said chain to said guide member at one end of said slot, and means coupled to the finger member at the other end of said chain for shifting the last-mentioned finger member longitudinally of said slot to selectively extend said chain to locate all of the finger portions in said chain in their tube receiving relationship to adjacent finger portions or to compress said chain to locate all of the finger portions in said chain in their tube locating relationship to adjacent finger portions to locate tubes supported on said table and engaged between said fingers in their final assembled relationship to each other.

6. The invention defined in claim 5 further comprising a pair of opposed header carrier assemblies respectively located in parallel spaced relationship outwardly from said two opposed sides of said table, each of said header carrier assemblies comprising a header carrier member adapted to detachably support a header member in spaced parallel relationship to the adjacent of said two opposed sides of said table with the openings in the supported header member at the same elevation as tubes supported on said table, means mounting said carrier assemblies for horizontal movement toward and away from the respective adjacent sides of said table between a retracted position wherein the headers supported on said carrier assemblies are spaced from each other by a distance greater than the length of a tube and an extended position wherein the headers supported on said carrier assemblies are spaced from each other by a distance less than the length of a tube and located in their final assembled relationship to each other.

7. The invention defined in claim 6 wherein said carrier member assemblies are aligned with said guide members in a manner such that a tube member engaged with the finger member at said one end of said chain will be aligned with the opening adjacent one end of a header member supported upon said carrier assembly.

8. The invention defined in claim 7 further comprising means mounting said guide members for vertical movement between an operating position wherein said finger portions project above said table and a retracted lowered position wherein said finger portions are located below the surface of said table.

9. The invention defined in claim 5 wherein said machine is operable to assemble a pair of opposed radiator side frame members to said header members to form a generally rectangular peripheral frame therewith, said machine further comprising a pair of opposed side frame carrier assemblies, each adapted to detachably support a side frame member extending normal to and in vertical alignment with header members supported on said header carrier members with the supported side frame members located laterally between the header members, one of said side frame carrier assemblies being fixedly mounted and the other side frame carrier assembly being mounted for horizontal movement toward and away from said one side frame carrier assembly between a retracted position wherein said frame members supported on said side frame carrier assemblies are spaced from each other by a distance substantially greater than the length of a header member and an extended position wherein the side frame members supported on said side frame carrier assemblies are located in their final assembled relationship to each other.

10. The method of assembling a radiator subassembly wherein a plurality of flat sided tubes are alternated between zigzag fins between a pair of side frame members interconnected at their opposite ends by a pair of spaced parallel header members, each of said header members having a series of uniformly spaced openings therethrough in which the ends of said tubes are seated, said method comprising the steps of:

(1) supporting a pair of said header members and a pair of said side frame members respectively along opposed sides of a horizontal rectangular assembly table, (2) locating a plurality of said tubes on said table in spaced, generally parallel, side-by-side relationship to each other between said headers with said tubes (a) extending generally normal to said header members (b) with the flat sides of adjacent tubes in spaced, opposed, face-to-face relationship to each other and (c) with adjacent tubes spaced from each other by a distacne greater than the spacing between adjacent openings in said header members, (3) depositing a fin onto said table between each pair of adjacent tubes and between each side frame member and the adjacent tube, (4) moving said tubes toward each other to their finally assembled spacing from each other to clamp said fins therebetween and locating said tubes in alignment with the openings in said header members, and (5) moving said header members and side members to their finally assembled position to cause the opposed ends of said tubes to be seated in said openings in said header members, and to engage said header members with said side frame members.

* * * * *

UNITED STATES PATENT OFFICE
CERTIFICATE OF CORRECTION

Patent No. 4,611,375          Dated 9/16/86

Inventor(s) John J. Zapawa

It is certified that error appears in the above-identified patent and that said Letters Patent are hereby corrected as shown below:

Column 4, line 35, delete "sidee" and insert --side--.

Column 4, line 66, delete "shwon" and insert --shown--.

Column 6, line 44, delete "a" and insert --an--. (2nd occurr.)

Column 6, line 45, delete "theradably" and insert --threadably--.

Signed and Sealed this

Twenty-seventh Day of January, 1987

*Attest:*

DONALD J. QUIGG

*Attesting Officer*      *Commissioner of Patents and Trademarks*